April 12, 1932.  F. EGERER  1,853,515
INFLATABLE BALL AND METHOD OF MAKING SAME

Filed Nov. 18, 1929   2 Sheets-Sheet 1

Inventor
Frank Egerer
By
Attorney

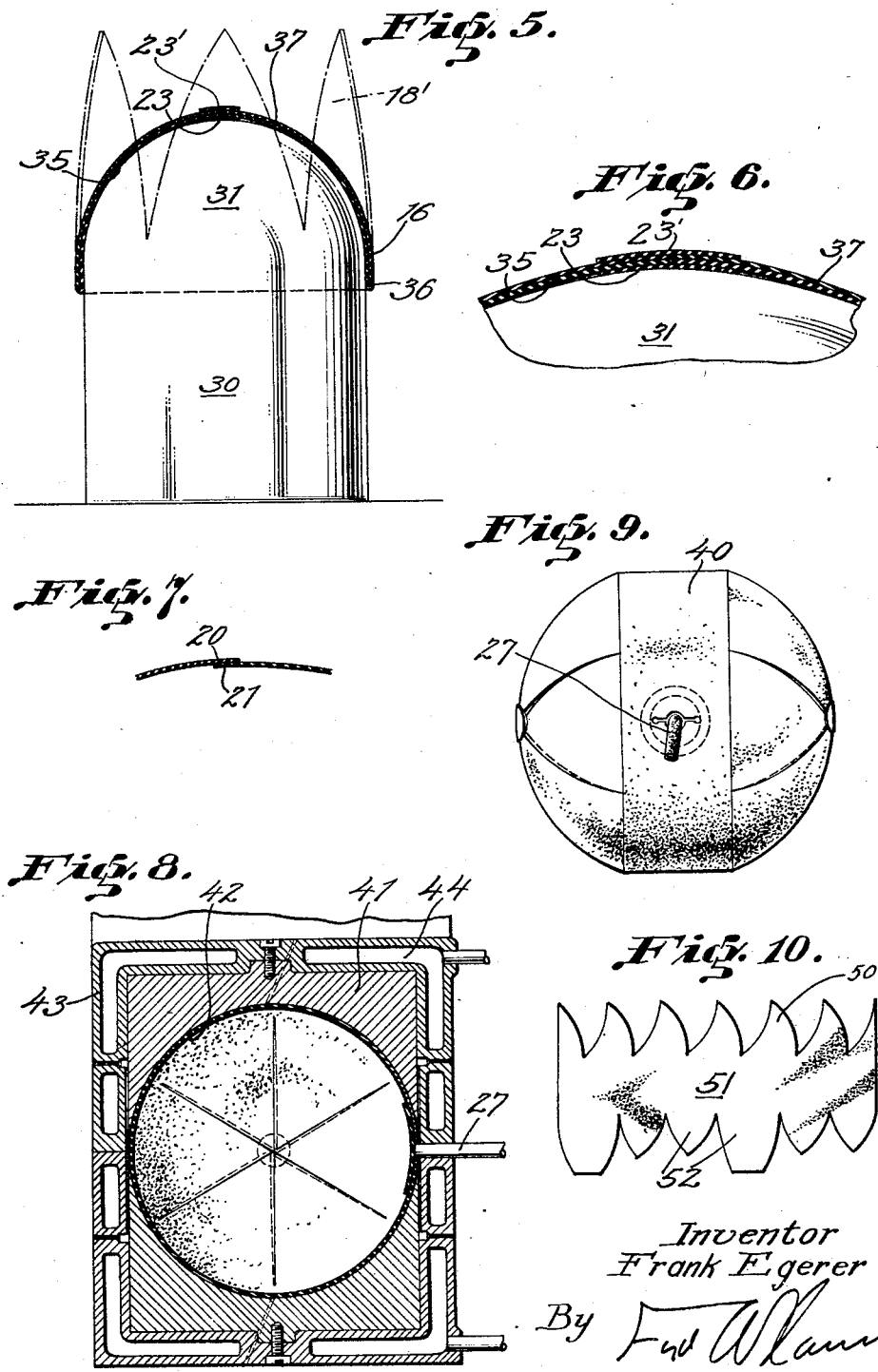

Patented Apr. 12, 1932

1,853,515

UNITED STATES PATENT OFFICE

FRANK EGERER, OF LOS ANGELES, CALIFORNIA, ASSIGNOR TO W. J. VOIT RUBBER COMPANY, OF LOS ANGELES, CALIFORNIA, A CORPORATION OF CALIFORNIA

INFLATABLE BALL AND METHOD OF MAKING SAME

Application filed November 18, 1929. Serial No. 408,093.

My invention relates to the manufacture of inflatable balls which are used in sports, and relates particularly to an inflatable ball and a new and improved method for making same.

My invention has for an object to provide a very sturdy ball construction, thus especially adapting the ball for severe usage.

A further object of the invention is to provide a ball consisting of an inflatable wall, such wall having the peculiar characteristics in form particularly pointed out in the following specification.

A further object of the invention is to provide a blank from which a ball may be quickly and perfectly made, the ball made from this blank being strong and sturdy and capable of withstanding the severe strains which are encountered in the use of sport balls.

It is an object of the invention to provide a blank for a rubber ball having a circumferential wall portion with leaves formed adjacently along the edges of the circumferential wall position, these leaves being so formed that when the edges thereof are secured together approximately spherical ends for the ball will be formed. The present method of making sport balls from sheet rubber includes the use of orange-peel segments, the edges of which are cemented together so as to form a ball. My invention is a considerable improvement over this known type of ball and this known method of manufacture. Instead of employing separate pieces of rubber which must be secured together, the invention employs a plurality of cooperating leaves or triangular portions which are held in preliminary cooperating positions by a central wall which may be termed the circumferential wall of the blank from which a ball is to be made.

It is also an object of the invention to provide a new and simple method for the manufacture of sport balls.

Further objects and advantages of the invention will be made evident throughout the following part of the specification.

Referring to the drawings which are for illustrative purposes only,

Fig. 5 is a view showing the manner of closing the second end of the ball.

Fig. 6 is an enlarged fragmentary sectional view showing the relative positions of the closed ends of a ball when the closing of the second end is completed, this view cooperating with Fig. 5 in illustrating the method forming part of the invention.

Fig. 7 is a fragmentary sectional view taken as indicated by the line 7—7 of Fig. 4, for showing an overlapped seam.

Fig. 8 shows a curing mold with a seamed blank placed therein, preparatory to vulcanizing the ball.

Fig. 9 is an elevational view of the ball, this view showing proportions which may be employed in the parts of the blank from which the ball is formed.

Fig. 10 is a fragmentary view showing a portion of a blank, this view having the purpose of indicating alternative forms of leaves which may be formed along the edges of the blank.

Figure 1:
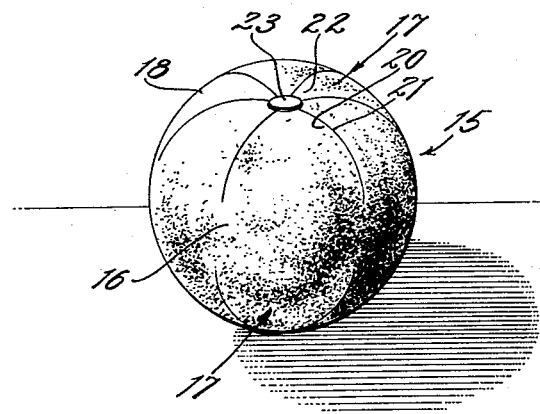
Fig. 1 is a view of a preferred form of ball made in accordance with my present invention.

As shown in Fig. 1, the preferred form of ball 15 embodying my invention includes a central circumferential wall portion 16 and spherical end portions 17 composed of triangular wall portions or leaves 18 secured together along the cooperating adjacent edges 20 and 21, the ends or points 22 of the leaves or triangular portions 18 being covered by a flat reinforcing member 23 which is preferably made in circular form. An important element of the invention is the blank 25 from which a ball such as indicated at 15 may be made. This blank 25 is preferably made from sheet rubber in tubular form and includes a central circumferential wall portion 16 having a width W and a length which is equivalent to the circumference of the tube of rubber from which the blank is made. Adjacent to the central circumferential wall portion 16, or along the sides thereof, notches are cut, as indicated at 26, so as to form edge portions for the blank 25 consisting of adjacent triangular leaves 18, the outward extension of the leaves 18, or what may be termed the lengths thereof, being designated at E.

Figure 2:
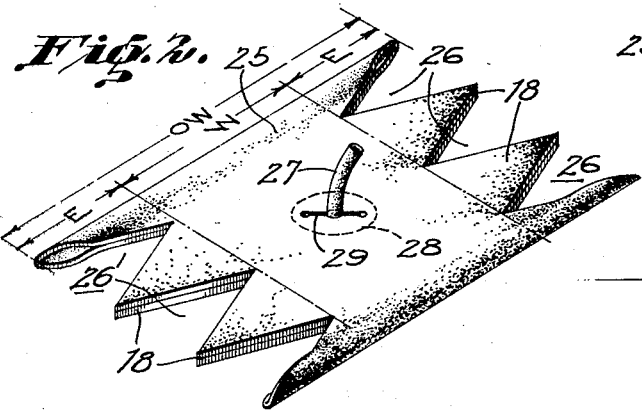
Fig. 2 is a view of a tubular blank forming a part of the invention.

It will be perceived that the blank 25 may be made from rubber tubing, or a flat sheet of raw rubber may have notches cut in the edges thereof, the ends of the notched sheet being secured together so as to form a tubular blank of substantially the character shown in Fig. 2. An additional manner of forming the blank would be to form a tube from sheet rubber and then cut notches in the ends of the tube adjacent to the central circumferential wall 16 of the blank thus formed. In Fig. 2 I have shown the blank 25 equipped with a filling valve consisting of a tube 27 which projects from a pocket 28 on the inner face of the blank 25 through an opening or slit 29.

Figure 3:
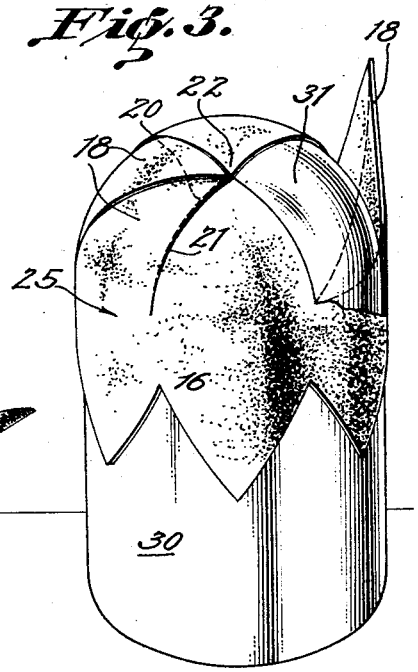
Fig. 3 shows an initial step in the forming of a ball from a blank such as shown in Fig. 2.
Figure 4:
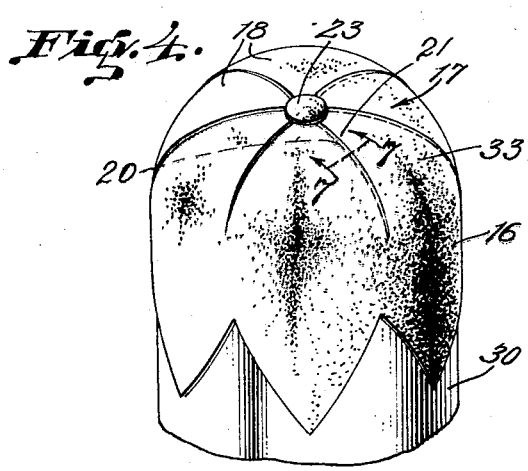
Fig. 4 shows a consecutive step in the forming of the ball.

The blank 25 is placed on a seaming form 30 which consists of a cylindrical block having a semi-spherical upper end 31. The blank 25 is pulled down on the form 30 to such position that the points or ends 22 of the triangular leaves 18 will meet in the manner shown in Fig. 3, when folded inwardly over the semi-spherical end 31. With the blank 25 in this position, the leaves are consecutively folded in, and the adjacent edges 20 and 21 are stuck together in overlapping relationship, either by use of cement or, if the rubber is of a particular adhesive nature, by removal of soapstone from the cooperating edges 20 and 21 so that the edge portions of the rubber may stick together due to their own adhesive characteristics. After the leaves 18 have all been folded in and joined together along their adjacent edges, a circular piece of raw rubber 32 is placed across and over the contiguous ends 22 in the manner shown in Fig. 4, it being understood that in the application of the reinforcing disc 23, the ordinary methods of securing portions of rubber together may be employed.

On completion of one end of the ball, the blank 25 is removed from the form 30, and the upper or finished end 33 is folded or bulged back into the circumferential wall portion 16, as would be done were it desired to turn the partly finished product inside out. The blank 25 is then replaced on the form 30 with the outer surface 34 of the finished end 33 lying in contact with the semi-spherical end 31, and with the reinforcing piece 23 lying against the upper end of the semi-spherical end 31. When the blank 25 is thus placed on the form 30, the circumferential wall 16 will be folded back on itself, along a central line of fold 36. The leaves of the second or unfinished end of the ball, as indicated by the dotted lines 18', may then be folded in and joined together as explained relative to Fig. 3 and as indicated by full lines 37 in Figs. 5 and 6, a reinforcing member 23 being placed over the contiguous ends of these leaves 18 of the second end of the ball, as indicated at 23'.

In the foregoing manner the ends of the blank are closed, thus producing a ball, such as indicated at 40 in Fig. 9, which is approximately, though not fully, circular in form, this ball 40 being ready for the final operation of curing the rubber. This is accomplished by placing the ball in a mold 41 having a spherical central opening 42 and having walls 43 which form a steam chamber or steam channels 44. The mold 41 is made of cooperating separable portions such as two cooperating halves. The mold 41 is closed with the uncured ball 40 in place therein, and air is then pumped into the uncured ball 40 through the valve tube 27, thus forcing the rubber walls of the ball into engagement with the spherical walls which define the spherical opening 42 of the mold 41. While the uncured ball is thus inflated within the mold, heat is applied thereto for the purpose of curing the rubber, this heat being preferably produced by conducting steam through the channels 44. The curing of the ball under pressure within the spherical mold produces a spherical ball such as the finished ball 15 shown in Fig. 1.

Although I prefer to employ triangular portions or leaves 18, I am aware that the shape of the leaves may be varied. As shown at 50 in Fig. 10, the leaves formed along the edges of a circumferential wall 51 may be of distorted triangular form, or, as shown at 52, may be given such other forms as will enable them to otherwise contribute to the forming of a practically spherical end when folded in and secured together in edge engagement, it being understood that the ball previous to its vulcanization need not be fully spherical but may be varied considerably from a true spherical form.

The preferred form of blank which I desire to employ in the practice of the invention has substantially the proportions shown in Fig. 2. The width of the circumferential wall 16, as represented by W, is preferably one-sixth of the length of the wall 16 or, in other words, one-sixth of the circumference of the rubber tube from which the blank 25 is cut. The outward extension E—E of the leaves 18 is preferably substantially equal to the width W, and the over all width OW of the blank 25 is then substantially equal to one-half the circumference of the tube from which the blank is made or one-half the length of the central circumferential wall portion 16. It will be recognized that these dimensions may be varied considerably, although it is desired to substantially maintain a width OW equal to one-half the length of the circumferential wall 16. The wall 16 may be made relatively narrow, or it may be made relatively wide, the variations in the width thereof requiring compensating variations in the extension of the leaves 18 so that a reasonably close approximation to a true sphere may be attained in the uncured ball.

The leaves or triangular wall portions 18 are held together in their relative positions by the circumferential wall portion 16. This is a decided improvement over the old method of attaching loose or separate pieces together, for it will be noted that the cylindrical wall 16 holds the leaves 18 in positions convenient for edge to edge engagement.

I claim as my invention:

1. In a hollow game ball of the character described, a circumferential wall having triangular portions along the edges thereof, the adjacent edges of said triangular portions being secured together.

2. In a hollow game ball of the character described, a circumferential wall having triangular portions along the edges thereof, the adjacent edges of said triangular portions being overlapped and secured together.

3. In a hollow game ball of the character described, a circumferential wall having triangular portions along the edges thereof, the adjacent edges of said triangular portions being secured together, and flat reinforcing pieces extending across the contiguous ends of said triangular portions.

4. In a hollow game ball of the character described, a circumferential wall having triangular portions along the edges thereof, the adjacent edges of said triangular portions being cemented and vulcanized together in overlapped relationship, flat reinforcing pieces cemented and vulcanized over the contiguous ends of said triangular portions, and a filling valve whereby said ball may be inflated.

5. In a hollow game ball of the character described, a circumferential wall in width substantially equal to one sixth the circumference of the ball and having triangular portions along the edges thereof, the adjacent edges of said triangular portions being secured together.

6. In a hollow game ball of the character described, a circumferential wall in width substantially equal to one sixth the circumference of the ball and having triangular portions along the edges thereof, the adjacent edges of said triangular portions being cemented and vulcanized together in overlapped relationship, flat reinforcing pieces cemented and vulcanized over the contiguous ends of said triangular portions, and a filling valve whereby said ball may be inflated.

7. In a hollow game ball of the character described, a circumferential wall having leaves formed along the edges thereof, the adjacent edges of said leaves being secured together whereby to close the ends of the ball.

8. In a hollow game ball of the character described, a circumferential wall having leaves formed along the edges thereof, the adjacent edges of said leaves being overlapped and secured together whereby to close the ends of the ball.

9. A blank for forming a ball, comprising a circumferential wall portion having adjacent triangular portions formed along each side thereof.

10. A blank for forming a ball, comprising a circumferential wall portion having adjacent triangular portions formed along each side thereof, the over-all width of said blank, including the width of said circumferential wall portion and the outward lengths of said tirangular portions, being approximately equal to one-half the length of said circumferential wall portion.

11. A blank for forming a ball, comprising a relatively thin-walled rubber tube having a central circumferential wall and edge walls on each side of said central wall, said edge walls consisting of adjacent leaves so formed that when in edge engagement they will contribute to forming ends for the ball.

12. A blank for forming a ball, comprising a rubber tube having a central circumferential wall portion and cooperating leaf portions along each side of said central wall, said leaf portions being adapted for edge to edge engagement whereby to form the ends of the ball.

13. A method of making a ball, comprising: forming a blank with a central circumferential wall and cooperating leaf portions along the sides of said circumferential wall; turning said leaves inwardly to positions of edge to edge engagement; and forming seams between the cooperating edges.

14. A method of making a ball, including: forming a blank with a circumferential wall portion and cooperating leaves projecting from the sides of said circumferential wall portion; and joining the adjacent edges of said leaves, thereby closing the ends of the blank and producing a hollow ball structure.

15. A method employed in making a ball, including: forming a blank with a central circumferential wall portion and laterally projecting leaves along both edges of said central wall portion; placing the blank on a form having a semi-cylindrical upper end in such position that said leaves may be folded over said cylindrical end into edge to edge engagement; folding said leaves into edge to edge engagement over the semi-spherical end of said form; and forming seams between the adjacent edges of said leaves.

16. A method of making a ball, including: forming a blank with a central circumferential wall portion and laterally projecting leaves along both edges of said central wall portion; placing the blank on a form having a semi-cylindrical upper end in such position that said leaves may be folded over said cylindrical end into edge to edge engagement; folding said leaves into edge to edge engagement over the semi-spherical end of said form; forming seams between the adjacent edges of said leaves; removing the partly closed blank from said form; inverting the closed end of said blank on said form; and then turning in and seaming the leaves of the second end of said blank over the previously closed end of said blank which rests in inverted position on said form.

17. A blank for forming a ball, comprising a circumferential wall portion having leaf portions formed along each side thereof, the leaf portions of each side being of such shape as to form an approximately hemispherical wall when the edges thereof are joined together.

18. In a blank for forming a hollow game ball of the character described, a circumferential wall of flexible material having projecting leaves formed along an edge thereof, said leaves being so shaped as to approximately form part of a hollow sphere when the edges thereof are joined together.

19. In a blank for forming a hollow game ball of the character described, a circumferential wall of flexible material having triangular leaves formed along an edge thereof.

In testimony whereof, I have hereunto set my hand at Los Angeles, California, this 2nd day of November, 1929.

FRANK EGERER.